ated States Patent US 9,619,492 B2
Gao et al.                                                                     (45) Date of Patent: Apr. 11, 2017

(54) DATA MIGRATION

(71) Applicant: International Business Machines Corporation, Armonk, NY (US)

(72) Inventors: Ying Ming Gao, Beijing (CN); Ang Li, Beijing (CN); Jian Liu, Beijing (CN); Zhuo Yin, Beijing (CN); Xian Zou, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 412 days.

(21) Appl. No.: 14/191,737

(22) Filed: Feb. 27, 2014

(65) Prior Publication Data

US 2014/0244654 A1    Aug. 28, 2014

(30) Foreign Application Priority Data

Feb. 28, 2013    (CN) .......................... 2013 1 0064513

(51) Int. Cl.
 G06F 17/00    (2006.01)
 G06F 17/30    (2006.01)

(52) U.S. Cl.
 CPC ...... *G06F 17/303* (2013.01); *G06F 17/30864* (2013.01); *G06F 17/30067* (2013.01);
 (Continued)

(58) Field of Classification Search
 CPC ......... G06F 17/30315; G06F 17/30321; G06F 17/3053; G06F 17/30572; G06F 17/30896;
 (Continued)

(56) References Cited

U.S. PATENT DOCUMENTS 6,434,558 B1* 8/2002 MacLeod .......... G06F 17/30595
7,181,731 B2* 2/2007 Pace ........................ G06F 8/60
                                                           707/999.01
(Continued)

FOREIGN PATENT DOCUMENTS

CN    1934568 A    3/2007
CN    1955965 A    5/2007
CN    102063500 A    5/2011

OTHER PUBLICATIONS

Shanmugam, Saravanan et al., Oracle Database 10g & Multi-Terabyte Database Migration, located at http://www.thehartford.com//oracle.sitecelerate.com/technetwork/database/features/availability/thehartfordprofile-xtts-133180.pdf, 10 pages.
(Continued)

*Primary Examiner* — Pierre Vital
*Assistant Examiner* — Andalib Lodhi
(74) *Attorney, Agent, or Firm* — Cantor Colburn LLP (57) ABSTRACT

In one embodiment, a method for data migration includes: receiving intermediate data and corresponding key value-row location information mapping list; importing each row of the intermediate data to a corresponding row of a target data table, where each row of the target data table has a target physical row ID; and establishing, by a computer processor, a target index of the target data table based on the target physical row IDs and the key value-row location information mapping list. With the method or system of this invention, the efficiency of reestablishing a data index after data migration can be improved.

18 Claims, 5 Drawing Sheets

(52) U.S. Cl.
CPC .. *G06F 17/30321* (2013.01); *G06F 17/30613* (2013.01); *G06F 17/30961* (2013.01)

(58) Field of Classification Search
CPC ............ G06F 17/246; G06F 17/30864; G06F 17/30292; G06F 17/30554; G06F 17/303; G06F 17/30917; G06F 17/30955; G06F 17/30424; G06F 17/3051; G06F 17/30991; G06F 17/247; G06F 17/30483; G06F 17/30958; G06F 17/30578; G06F 17/30221; G06F 17/30312; G06F 17/30386; G06F 17/30371; G06F 11/1448; G06F 17/227; G06F 17/24; G06F 17/30595; G06F 17/30011; G06F 17/30073
See application file for complete search history.

(56) References Cited

U.S. PATENT DOCUMENTS

| | | |
|---|---|---|
| 7,240,066 B2 | 7/2007 | Burchall et al. |
| 7,293,040 B2 | 11/2007 | Terada |
| 7,987,164 B2 | 7/2011 | Hu et al. |
| 2003/0051236 A1 | 3/2003 | Pace et al. |
| 2007/0220027 A1* | 9/2007 | Richey ................. G06Q 10/06 |
| 2008/0228802 A1 | 9/2008 | Marshall |
| 2012/0310985 A1* | 12/2012 | Gale ................. G06F 17/30578 |
| | | 707/792 |

OTHER PUBLICATIONS

Liu Hua-Quing et al., "Database Indexing and Optimization", Jiangsu Plytechnic of Finance & Economics Huaian 223003, Jun. 30, 2012.

* cited by examiner

DATA MIGRATION

PRIORITY

This application claims priority to Chinese Patent Application No. 201310064513.4, filed Feb. 28, 2013, and all the benefits accruing therefrom under 35 U.S.C. §119, the contents of which in its entirety are herein incorporated by reference.

BACKGROUND

The present invention relates to data processing, and more specifically, to data migration.

Figure 2:
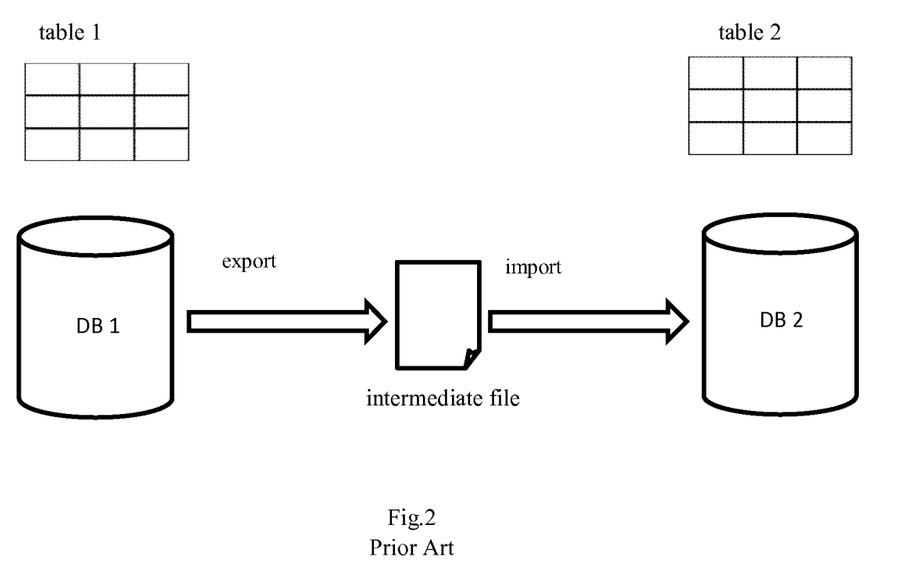
FIG. 2 shows a typical process of data migration.

Data migration is an event that may occur frequently as computer systems that support big data environments become more prevalent. FIG. 2 shows a typical data migration process applicable to various commercial database systems, in which all data from a source data table (table 1) of a source database (DB 1) is migrated to a target data table (table 2) of a target database (DB 2). To this end, generally, the following steps are used: first, data of the source data table (table 1) is exported to an intermediate file to form intermediate data, where the intermediate file may take various file forms. For example, the intermediate data may be in the form of a database table having data information consistent with that of the source data table, e.g. with the contents of the rows of the intermediate data corresponding to the rows of the source data table. Next, the intermediate data may be imported to the target data table (table 2) from the intermediate file, and a target index may be regenerated from the target data table for retrieving the target data table.

In mainstream relational databases, the index structure is generally a B+ tree or a B− tree, where the leaf nodes of the tree are formed by index entries having a specific structure of a tuple of Key Value and a set of row IDs: <KeyValue, $\{RID_1, \ldots RID_n\}$>, where n is a natural number, and where KeyValue represents values in an indexed column (i.e., one or more columns) of the data table. For example, given a "province" column to be indexed in the table, key values of corresponding index leaf nodes may be Hebei, Henan, Hubei, Hunan, generally in ascending order or descending order. RID (row ID) indicates ID information of various data rows corresponding to a key value in the data table (e.g., one row for a unique index, and several rows for a non-unique index). Because RIDs generally correspond to particular physical storage information of data rows, they are not reusable during a data migration process. Still taking the index of "Province" column as an example, typical leaf nodes in the "Province" index are generally shown as follows:

Index leaf node 1: <"Hebei", $\{RID_1, RID_5, RID_7, \ldots, RID_j\}$>, representing that the key value "Hebei" appears on the 1, 5, 7, . . . , and j rows respectively, where j is a natural number;

Index leaf node 2: <"Henan", $\{RID_2, RID_3, RID_6, \ldots, RID_k\}$>, representing that the key value "Henan" appears on the 2, 3, 6, . . . , and k rows respectively, where k is a natural number.

Currently, the process of generating an index for a relational database includes the following.

(1) A database engine may scan various data tables, extract index key values from various data rows (i.e., records) in sequence and construct corresponding "index leaf entries."

(2) The above "index leaf entries" are sorted in the unit of the sort space of the database, and the sorted results are written onto the disk as an "intermediate sort sequence."

(3) The above (1) and (2) are repeated until all data records have been traversed and corresponding index leaf entries have been written to a "intermediate sort sequence."

(4) In memory, a merging sort is performed on the "intermediate sort sequences" to generate a single ordered sequence, from which an index is constructed. This process may be as follows: (a) find an index entry with the minimum (or maximum) key value from a first index entry of each of the intermediate sort sequences; perform a merge step if there is more than one index entry that satisfies this condition; use the index entry with the minimum (or maximum) key value to construct the first index leaf node; (b) process a next index entry with the minimum (or maximum) key value in sequence; when a first index leaf block is full with processed index entries, write that first index leaf block to the disk and start the construction of a next index leaf block; (c) construct intermediate index nodes while writing the index leaf block, and write an index leaf block to the disk once it is completely populated; (d) repeat (a), (b), (c) until the whole index construction is finished.

There is a problem with the above traditional data migration process. Because the target data table generally has a huge amount of data, reconstructing an index directly for the target data table may take a lot of time, so that regular services may be affected severely.

SUMMARY

In one embodiment, a method for data migration includes: receiving intermediate data and corresponding key value-row location information mapping list; importing each row of the intermediate data to a corresponding row of a target data table, where each row of the target data table has a target physical row ID; and establishing, by a computer processor, a target index of the target data table based on the target physical row ID and the key value-row location information mapping list.

In another embodiment, a system for data migration includes: a receiving unit, configured to receive intermediate data and corresponding key value-row location information mapping list; an import unit, configured to import each row of the intermediate data to a corresponding row of a target data table, where each row of the target data table has a target physical row ID; and a first target index establishment unit, configured to establish a target index of the target data table based on the target physical row ID and the key value-row location information mapping list.

In yet another embodiment, a computer program product includes a computer readable storage medium having computer readable program code embodied thereon. The computer readable program code is executable by a processor to perform a method for data migration. The method includes receiving intermediate data and corresponding key value-row location information mapping list; importing each row of the intermediate data to a corresponding row of a target data table, where each row of the target data table has a target physical row ID; and establishing a target index of the target data table based on the target physical row ID and the key value-row location information mapping list.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some particular embodiments will be described below in more detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and to convey the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create unit for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
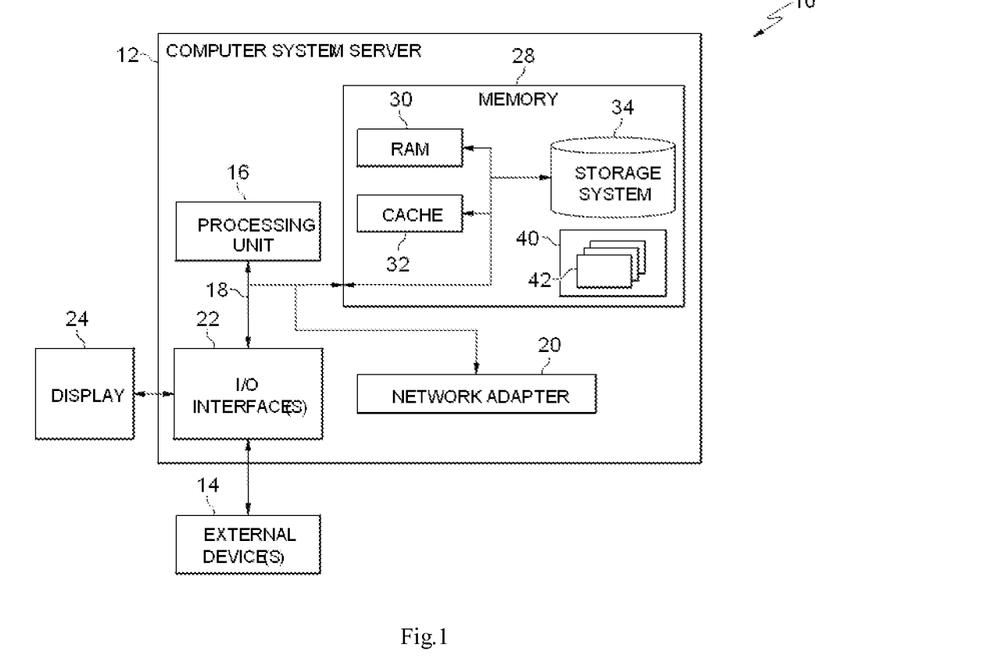
FIG. 1 shows an exemplary computer system 100 configurable to implement an embodiment.

FIG. 1 illustrates an exemplary computer system 12, such as a server, which is applicable to implement some embodiments of this disclosure. Computer system 12 is only illustrative and is not intended to suggest any limitation as to the scope of use or functionality of embodiments of the invention described herein.

As shown in FIG. 1, computer system 12 is shown in the form of a general-purpose computing device. The components of computer system 12 may include, but need not be limited to, one or more processors or processing units 16, a system memory 28, and a bus 18 that couples various system components together, including system memory 28 to processor 16.

Bus 18 represents one or more of any of several types of bus structures, including a memory bus or memory controller, a peripheral bus, an accelerated graphics port, and a processor or local bus using one of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be available media that is accessible by computer system 12, and may include both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further described below, memory 28 may include at least one program product having a set (e.g., at least one) of program modules that are configured to carry out the functions of embodiments of this disclosure.

Program/utility 40, having a set (at least one) of program modules 42, may be stored in memory 28, along with an operating system, one or more application programs, other program modules, and program data. Each of the operating system, one or more application programs, other program modules, and program data, or some combination thereof may include an implementation of a networking environment. Program modules 42 may generally carry out the functions and/or methodologies of embodiments of this disclosure as described herein.

Computer system 12 may also communicate with one or more external devices 14, such as a keyboard, a pointing device, a display 24, etc.; one or more devices that enable a user to interact with computer system 12; and/or one or more devices (e.g., network card, modem, etc.) that enable computer system 12 to communicate with one or more other computing devices. Such communication can occur via Input/Output (I/O) interfaces 22. Still yet, computer system 12 can communicate with one or more networks, such as a local area network (LAN), a general wide area network (WAN), and/or a public network (e.g., the Internet) via network adapter 20. As depicted, network adapter 20 communicates with the other components of computer system 12 via bus 18. It should be understood that, although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 3:
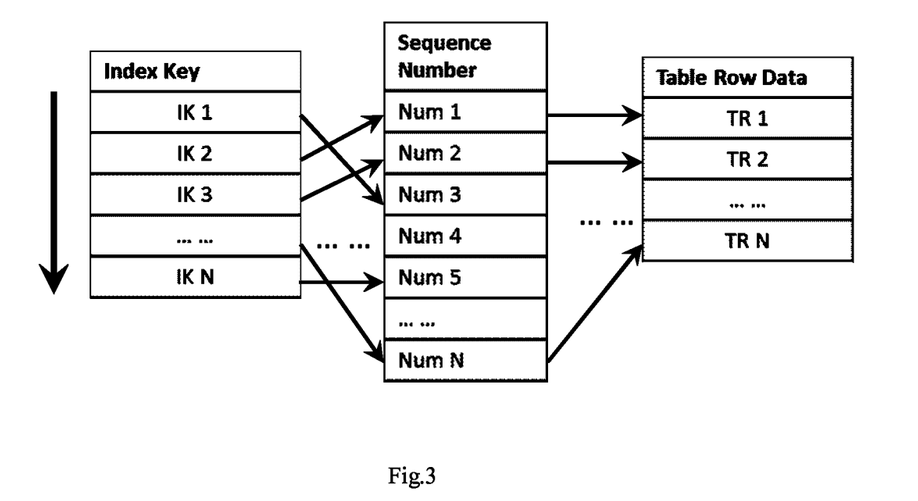
FIG. 3 shows a method for data migration in accordance with an embodiment.

According to some embodiments, the conventional problem of how to speed up target index reconstruction can be resolved based on the source index of the source data table. FIG. 3 shows the basic idea of the data migration method, according to some embodiments, which utilizes the existing source index of the source data table of the source database to improve the efficiency of reconstructing an index of the target table of the target database. The source index of the source data table cannot be utilized directly for the target data table, primarily because the row IDs in the index leaf entries are physical storage location code numbers of the data rows, and changes in physical storage locations in the data migration process may inevitably cause changes of corresponding row IDs. Besides, different databases generally have incompatible row ID encoding manners. However, the logic structure of the source index may be helpful for the reconstruction of the target index of the target data table. If it can be exported through a certain method, the efficiency of reconstructing the target table index may be improved.

Figure 6:
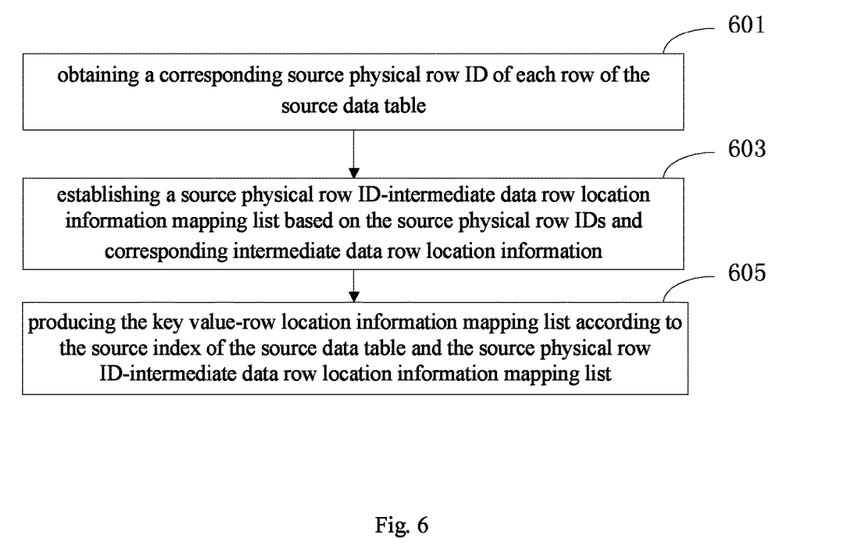
FIGS. 6 and 7 show how to generate a key value-row location information mapping list for intermediate data in accordance with an embodiment.

According to some embodiments, through substituting the source physical row IDs in the source index leaf entries with row location information corresponding to the intermediate data, which may remain unchanged during the data migration process, such as corresponding Sequence Number (SN) in the intermediate file MF of Table Row data (i.e., row numbers of intermediate data), the logic structure of the source index can be reused to construct a one-to-one correspondence between the key values and the row numbers as shown in FIG. 3. For instance, as shown, row number (Num) 3 corresponds to index key value ("key value," hereinafter) IK1. Certainly, a key value may correspond to several intermediate data row numbers. The structure of the conversed index entries is shown in FIG. 6: <IKj, {SN1, . . . SNn}>, where j and n are natural numbers. Because the intermediate data entries may also correspond to the row numbers in the target data table one by one (in fact, the row numbers of the source data table may correspond to the row numbers of the target data one by one), through using the key values and the constant row location information, and then obtaining new physical storage location information corresponding to the target data, the index of the target data table can be reconstructed fast. The result may be a technical effect that is unexpected by those skilled in the art.

Figure 4:
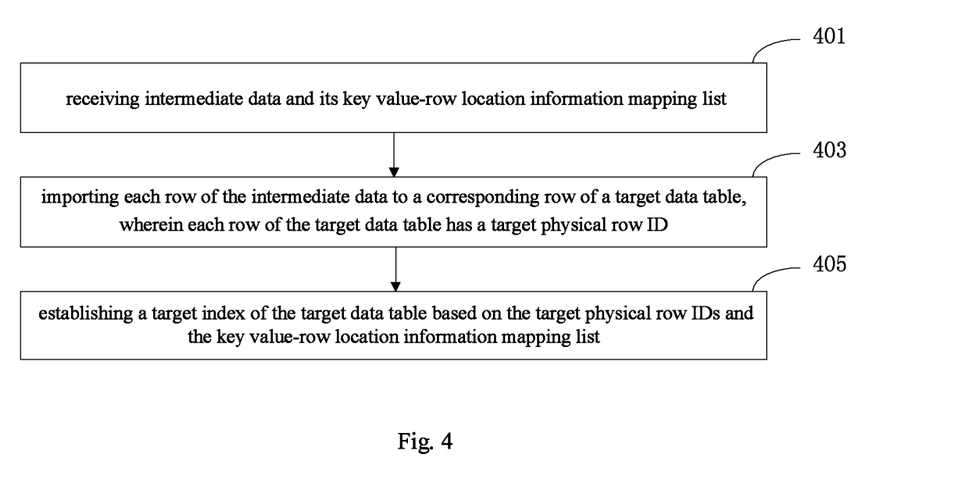
FIGS. 4 and 5 show a more detailed method for data migration in accordance with an embodiment.
Figure 5:
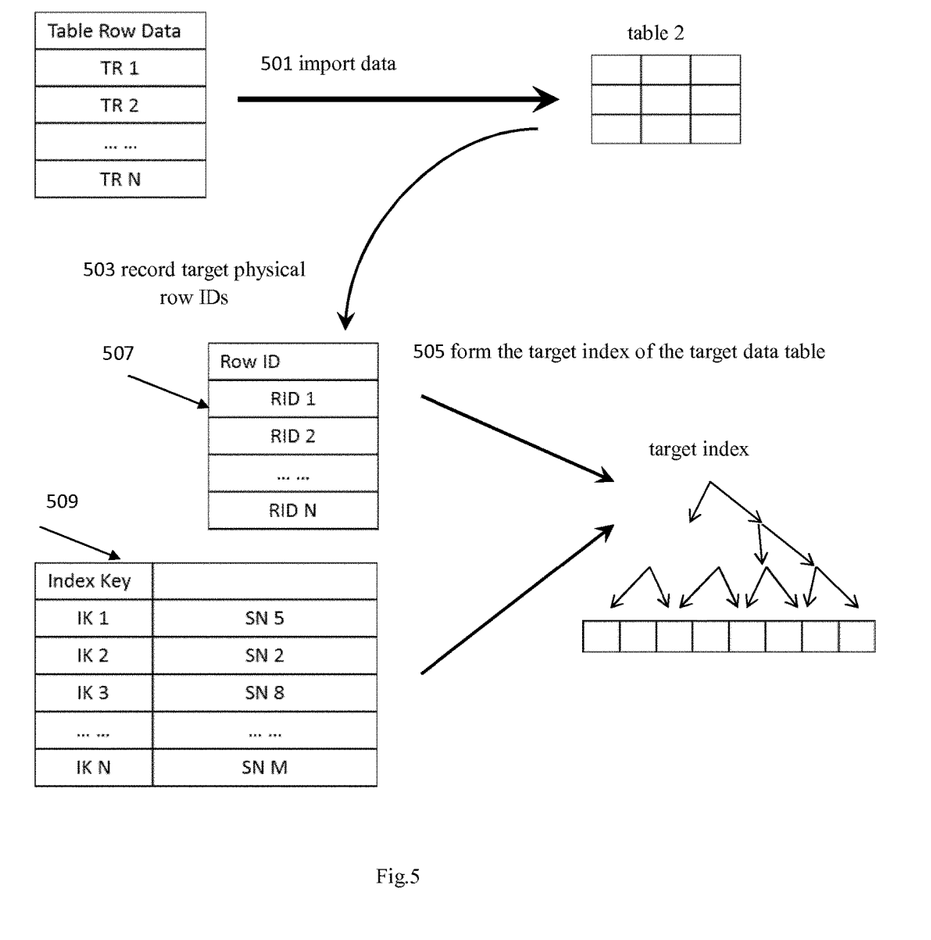

FIGS. 4 and 5 show a more detailed particular embodiment of the method for data migration. At block 401, intermediate data and its key value-row location information mapping list are received. As discussed above, it is common to produce intermediate data before data migration. The intermediate data may be represented in various file formats, for example, in a delimited ASCII file (DEL) or an integrated exchange format (IXF) file. The key value-row location information mapping list of the intermediate data may be formed based on physical row IDs of the source data table, the source index of the source data table, and corresponding intermediate data (source data) row location information. The row location information may be row numbers of the intermediate data. How to produce the key value-row location information mapping list will be particularly described with reference to FIGS. 6 and 7 below.

At block 403, each row of the intermediate data may be imported to a corresponding row of a target data table, wherein each row of the target data table may have a target physical row ID. Particularly, as shown in FIG. 5, at block 501, each row of the intermediate data of the intermediate file may be imported into a corresponding row of a target data table 2. Although the source data table, the intermediate file, and the target data table may have different specific structures, they may have common data contents, with data rows in one to one correspondence. In the target database, each row of data in the target data table may be allocated with a new target physical row ID to indicate its particular storage location. Therefore, at block 503, target physical row IDs may be recorded. For example, the target physical row IDs may be recorded in the row sequence of the target data table to form a target physical row ID sequence 507, which is ordered in the row sequence. Preferably, the target physical row ID sequence may be stored in the form of a list or an array. It may also be possible to record a target physical row ID when each row of data is imported, to form the target physical row ID sequence directly.

At block 405, based on the target physical row IDs and the key value-row location information mapping list, a target index may be established for the target data table. For instance, through replacing corresponding intermediate row location information in the key value-row location information mapping list with the target physical row IDs, the target index of the target data table may be established based on the replaced key value-row location information mapping list. Establishing the target index of the target data table based on the replaced key value-row location information mapping list may include using various rows of data in the key value-row location information mapping list as index leaf entries to establish the target index of the target data table as described above. In some embodiments, the source index of the source data table may be exported as an intermediate index. Note that the physical row IDs of the index leaf entries of the intermediate index may still be the physical row IDs of the source data table, and thus may be unable to be used directly for the target index of the target data table. In this case, corresponding intermediate data row numbers in the key value-row location information mapping list can be replaced with the target physical row IDs in sequence. Then the source physical row IDs of the index leaf entries of the intermediate index may be replaced with the target physical row IDs in the replaced key value-row location information mapping list to obtain the target index of the target data table. Thus, the target index can be established efficiently.

More particularly, the target index of the target data table may be formed at block 505 of FIG. 5 as follows: (1) import each row of data <IK$_j$, {SN$_1$, . . . SN$_n$}> of the key value-row location information mapping list 509 in sequence, j and n are natural numbers; (2) according to the SN$_i$ of each row, where i is a natural number, directly calculate an addition of the target physical row ID sequence 507, obtain a new target physical row ID, and replace the corresponding SN$_i$ (For example, as to SN$_5$ (i=5) of the fifth row, determine the fifth target physical row ID RID 5 in the target physical row ID sequence 507, and replace SN$_5$ with the value of the fifth target physical row ID RID 5 in the key value-row location information mapping list 509, to form a mapping list of key values and new target physical row IDs); and (3) construct the target index from the replaced key value-row location information mapping list 509.

Figure 7:
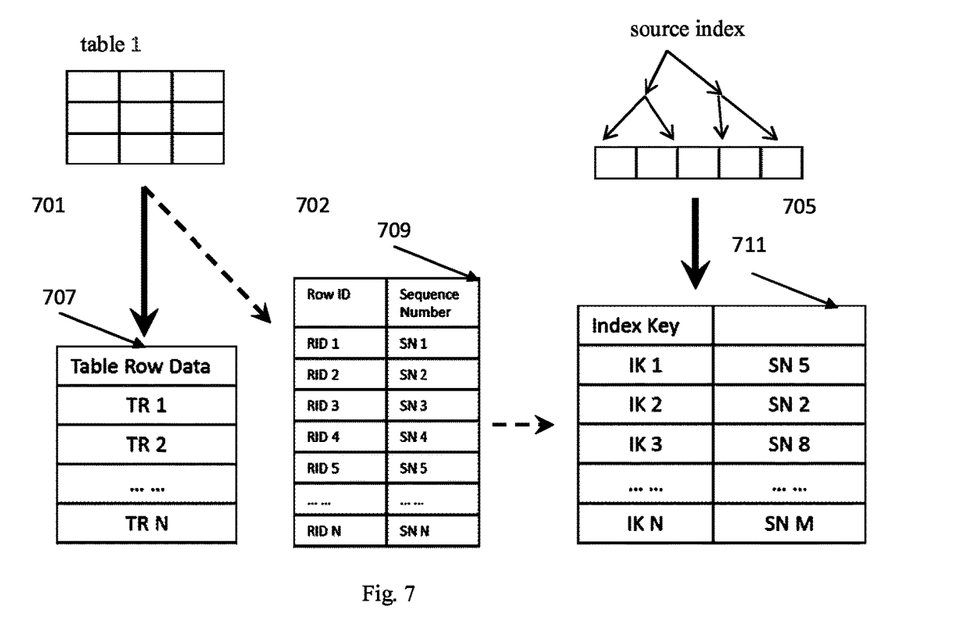

FIGS. 6 and 7 show how to generate a key value-row location information mapping list for intermediate data, according to some embodiments. At block 601, a corresponding source physical row ID of each row of the source data table may be obtained. As described above, each row of the source data table may have its corresponding physical storage location, which may be indicated by its source physical row ID, and those physical row IDs may correspond to the data rows of the source data table in a one-to-one correspondence. Thereby, the source physical row ID corresponding to each row of the source data table can be obtained directly.

At block 603, a source physical row ID-intermediate data row location information mapping list may be established based on the source physical row IDs and the corresponding intermediate data row location information. According to one aspect of this disclosure, intermediate data may be outputted, and the location information of the intermediate data may correspond to the rows of the source data one by one. Thus, the source physical row ID of each row of the source data may also correspond to the row location information of the intermediate data one by one. Thereby a source physical row ID-intermediate data row location information mapping list may be formed.

At block 605, according to the source index of the source data table and the source physical row ID-intermediate data row location information mapping list, the key value-row location information mapping list may be produced. The index leaf entry of the source index of the source data table may include source physical row IDs corresponding to its key value. Through replacing the corresponding source physical row numbers of the index leaf entry in the source index of the source data table with the intermediate row location information of the source physical row ID-intermediate data row location information mapping list, the key value-row location information mapping list may be produced.

More particularly, as shown in FIG. 7, generating a key value-row location information mapping list from the source data table and the source index may include: at block 701, exporting intermediate data 707; at block 703, establishing a source physical row ID-intermediate row location information mapping list 709; at block 705, using the source index, the source physical row ID-intermediate data row location information mapping list. Through replacing the source physical row IDs of the index leaf entry of the source index with corresponding intermediate data row locators, a key value-row location information mapping list 711 may be generated. For example, before replacement: index leaf entry 1: <key value 1, {RID$_1$, RID$_2$, . . . , RID$_n$}>; index leaf entry 2: <key value 2, {RID$_5$, . . . , RID$_m$}>; . . . ; leaf N. After replacement: leaf 1: <key value 1, {SN$_1$, SN$_2$, . . . , SN$_n$}>; leaf 2: <key value 2, {SN$_5$, . . . , SN$_m$}>; . . . ; leaf N', where n and m are natural numbers.

Figure 8:
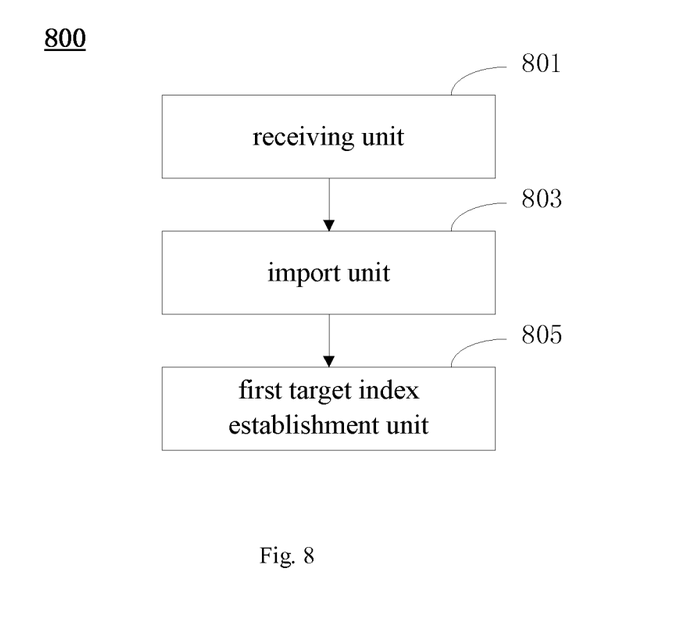
FIG. 8 shows a block diagram of a system for data migration in accordance with an embodiment.

According to another aspect of this disclosure, a system 800 for data migration as shown in FIG. 8 is further provided. The system 800 may include: receiving unit 801, configured to receive intermediate data and its key value-row location information mapping list; import unit 803, configured to import each row of the intermediate data to a corresponding row of a target data table, where each row of the target data table has a target physical row ID; and target index establishment unit 805, configured to establish a target index of the target data table based on the target physical row ID and the key value-row location information mapping list. The implementations of the various units above have been particularly described above.

The system 800 may further include intermediate data export unit, configured to export intermediate data based on the source data table.

Still further, the system 800 may include an obtaining unit, configured to obtain a corresponding source physical row ID of each row of the source data table; a mapping list establishment unit, configured to establish a source physical row ID-intermediate data row location information mapping list based on source physical row IDs and corresponding intermediate data row location information; a generation unit, configured to generate the key value-row location information mapping list according to the source index of the source data table and the source physical row ID-intermediate data row location information mapping list.

In some embodiments, the target index establishment unit may include: a first replacement unit, configured to replace corresponding intermediate data row location information in the key value-row location information mapping list with the target physical row IDs; and a second target index establishment unit, configured to establish the target index of the target data table based on the replaced key value-row location information mapping list.

The second target index establishment unit may include: a third target index establishment unit, configured to establish the target index of the target data table through using various rows of data in the replaced key value-row location information mapping list as index leaf entries.

In some embodiments, the system 800 may further include: an intermediate index export unit, configured to export an intermediate index based on the source index of the source data table.

The target index establishment unit may include: a second replacement unit, configured to replace corresponding intermediate data row numbers in the key value-row location information mapping list with the target physical row IDs in sequence; and a third replacement unit, configured to replace source physical row IDs in index lead entries of the intermediate index based on target physical row IDs in the replaced key value-row location information mapping list to obtain the target index of the target data table.

The generation unit may include: a fourth replacement unit, configured to replace corresponding source physical row numbers in index leaf entries of the source index of the source data table with intermediate data row location information in the source physical row ID-intermediate data row location information mapping list to generate the key value-row location information mapping list.

The row location information may be row numbers of the intermediate data.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data migration, comprising:
   providing intermediate data and a key value-row location information mapping list, wherein the intermediate data is based on a source data table, and wherein the key value-row location information mapping list describes one or more row locations of each key value in a source data table;
   migrating the source data table to the target data table by importing each row of the intermediate data to a corresponding row of a target data table, wherein the target data table comprises a plurality of target rows, and wherein each target row of the target data table has a target physical row identifier (ID); and
   establishing, on a processor, a target index of the target data table based on the target physical row IDs of the plurality of target rows and based on the key value-row location information mapping list, wherein the target index of the target data table is a tree comprising a plurality of leaf nodes, and wherein each leaf node of the tree comprises a key value of the target data table and a set of corresponding row IDs of the target data table;
   wherein the providing the intermediate data and the key value-row location information mapping list further comprises generating the key value-row location information mapping list according to a source index of the source data table and a source physical row ID-intermediate data row location information mapping list, and wherein the generating comprises:
   replacing source physical row numbers in index leaf entries of the source index of the source data table with corresponding intermediate data row location information in the source physical row ID-intermediate data row location information mapping list to generate the key value-row location information mapping list.

2. The method according to claim 1, wherein providing the intermediate data and the key value-row location information mapping list further comprises:
   exporting the intermediate data based on the source data table.

3. The method according to claim 1, wherein providing the intermediate data and the key value-row location information mapping list further comprises:
   obtaining a corresponding source physical row ID of each row of the source data table;
   establishing the source physical row ID-intermediate data row location information mapping list based on the source physical row IDs and the corresponding intermediate data row location information.

4. The method according to claim 1, wherein establishing the target index of the target data table based on the target physical row IDs and the key value-row location information mapping list comprises:
replacing the intermediate data row location information in the key value-row location information mapping list with the corresponding target physical row IDs; and
establishing the target index of the target data table based on the replaced key value-row location information mapping list.

5. The method according to claim 4, wherein establishing the target index of the target data table based on the replaced key value-row location information mapping list comprises:
establishing the target index of the target data table through using various rows of data in the replaced key value-row location information mapping list as index leaf entries.

6. The method according to claim 1, further comprising: exporting an intermediate index based on the source index of the source data table.

7. The method according to claim 6, wherein establishing the target index of the target data table based on the target physical row IDs and the key value-row location information mapping list comprises:
replacing the intermediate data row numbers in the key value-row location information mapping list with the corresponding target physical row IDs in sequence; and
replacing source physical row IDs in index leaf entries of the intermediate index based on target physical row IDs in the replaced key value-row location information mapping list to obtain the target index of the target data table.

8. A system for data migration, comprising:
a memory having computer readable instructions; and
one or more processors for executing the computer readable instructions, the computer readable instructions comprising:
providing intermediate data and a key value-row location information mapping list, wherein the intermediate data is based on a source data table, and wherein the key value-row location information mapping list describes one or more row locations of each key value in a source data table;
migrating the source data table to the target data table by importing each row of the intermediate data to a corresponding row of a target data table respectively, wherein the target data table comprises a plurality of target rows, and wherein each target row of the target data table has a target physical row identifier (ID); and
establishing a target index of the target data table based on the target physical row IDs of the plurality of target rows and based on the key value-row location information mapping list, wherein the target index of the target data table is a tree comprising a plurality of leaf nodes, and wherein each leaf node of the tree comprises a key value of the target data table and a set of corresponding row IDs of the target data table;
wherein the providing the intermediate data and the key value-row location information mapping list further comprises generating the key value-row location information mapping list according to a source index of the source data table and a source physical row ID-intermediate data row location information mapping list, and wherein the generating comprises:
replacing source physical row numbers in index leaf entries of the source index of the source data table with corresponding intermediate data row location information in the source physical row ID-intermediate data row location information mapping list to generate the key value-row location information mapping list.

9. The system according to claim 8, wherein providing the intermediate data and the key value-row location information mapping list further comprises:
exporting the intermediate data based on the source data table.

10. The system according to claim 8, wherein providing the intermediate data and the key value-row location information mapping list further comprises:
obtaining a corresponding source physical row ID of each row of the source data table;
establishing the source physical row ID-intermediate data row location information mapping list based on the source physical row IDs and the corresponding intermediate data row location information.

11. The system according to claim 8, wherein establishing the target index of the target data table based on the target physical row IDs and the key value-row location information mapping list comprises:
replacing the intermediate data row location information in the key value-row location information mapping list with the corresponding target physical row IDs; and
establishing the target index of the target data table based on the replaced key value-row location information mapping list.

12. The system according to claim 11, wherein establishing the target index of the target data table based on the replaced key value-row location information mapping list comprises:
establishing the target index of the target data table through using various rows of data in the replaced key value-row location information mapping list as index leaf entries.

13. The system according to claim 8, the computer readable instructions further comprising:
exporting an intermediate index based on the source index of the source data table.

14. The system according to claim 13, wherein establishing the target index of the target data table based on the target physical row IDs and the key value-row location information mapping list comprises:
replacing the intermediate data row numbers in the key value-row location information mapping list with the corresponding target physical row IDs in sequence; and
replacing source physical row IDs in index leaf entries of the intermediate index based on target physical row IDs in the replaced key value-row location information mapping list to obtain the target index of the target data table.

15. A computer program product comprising a non-transitory computer readable storage medium having computer readable program code embodied thereon, the computer readable program code executable by a processor for:
providing intermediate data and a key value-row location information mapping list, wherein the intermediate data is based on a source data table, and wherein the key value-row location information mapping list describes one or more row locations of each key value in a source data table;
migrating the source data table to the target data table by importing each row of the intermediate data to a corresponding row of a target data table, wherein the target data table comprises a plurality of target rows, and wherein each target row of the target data table has a target physical row identifier (ID); and establishing a target index of the target data table based on the target physical row IDs of the plurality of target rows and based on the key value-row location information mapping list, wherein the target index of the target data table is a tree comprising a plurality of leaf nodes, and wherein each leaf node of the tree comprises a key value of the target data table and a set of corresponding row IDs of the target data table;

wherein the providing the intermediate data and the key value-row location information mapping list further comprises generating the key value-row location information mapping list according to a source index of the source data table and a source physical row ID-intermediate data row location information mapping list, and wherein the generating comprises:

replacing source physical row numbers in index leaf entries of the source index of the source data table with corresponding intermediate data row location information in the source physical row ID-intermediate data row location information mapping list to generate the key value-row location information mapping list.

16. The computer program product of claim 15, wherein providing the intermediate data and the key value-row location information mapping list further comprises:

obtaining a corresponding source physical row ID of each row of the source data table;

establishing the source physical row ID-intermediate data row location information mapping list based on the source physical row IDs and the corresponding intermediate data row location information.

17. The computer program product of claim 15, wherein establishing the target index of the target data table based on the target physical row IDs and the key value-row location information mapping list comprises:

replacing the intermediate data row location information in the key value-row location information mapping list with the corresponding target physical row IDs; and establishing the target index of the target data table based on the replaced key value-row location information mapping list.

18. The computer program product of claim 17, wherein establishing the target index of the target data table based on the replaced key value-row location information mapping list comprises:

establishing the target index of the target data table through using various rows of data in the replaced key value-row location information mapping list as index leaf entries.

* * * * *